(12) United States Patent
Kimoto et al.

(10) Patent No.: US 7,112,387 B2
(45) Date of Patent: Sep. 26, 2006

(54) BATTERY POWER SUPPLY DEVICE

(75) Inventors: Shinya Kimoto, Toyohashi (JP); Takaki Kobayashi, Toyohashi (JP); Ko Watanabe, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 64 days.

(21) Appl. No.: 10/163,766

(22) Filed: Jun. 5, 2002

(65) Prior Publication Data

US 2002/0187390 A1    Dec. 12, 2002

(30) Foreign Application Priority Data

Jun. 5, 2001  (JP) .............................. 2001-170230

(51) Int. Cl.
  *H01M 2/10* (2006.01)
  *H01M 2/12* (2006.01)
(52) U.S. Cl. ........................... 429/99; 429/120
(58) Field of Classification Search ................. 429/82, 429/83, 87, 88, 96–100, 120, 149, 152, 153, 429/156, 157, 159; 180/68.5
See application file for complete search history.

(56) References Cited

U.S. PATENT DOCUMENTS

| 4,522,898 | A | * | 6/1985 | Esrom | .................... | 429/120 |
| 4,792,378 | A | * | 12/1988 | Rose et al. | ................... | 438/706 |
| 4,865,929 | A | * | 9/1989 | Eck | ............................. | 429/120 |
| 5,585,204 | A | * | 12/1996 | Oshida et al. | ................ | 429/62 |
| 5,879,833 | A | * | 3/1999 | Yoshii et al. | ................. | 429/62 |

FOREIGN PATENT DOCUMENTS

| JP | 06001150 A | * | 1/1994 |
| JP | 10-003950 |   | 1/1998 |
| JP | 10 270095 A |  | 10/1998 |
| JP | 11 067178 A |  | 3/1999 |
| JP | 11213976 A | * | 8/1999 |
| JP | 2000 280759 A |  | 10/2000 |

OTHER PUBLICATIONS

Linden "Handbook of Batteries", 1995, McGraw-Hill, Inc., 2nd Ed., pp. 24.34-24.36.*

* cited by examiner

*Primary Examiner*—Gregg Cantelmo
(74) *Attorney, Agent, or Firm*—Snell & Wilmer L.L.P.

(57) ABSTRACT

A battery power supply device of the present invention includes a battery pack in which a plurality of battery modules each includes a plurality of cells which are serially connected together both electrically and mechanically, the plurality of battery modules housed in a holder, and the battery power supply device is structured so that a cooling medium flows around each cell and/or each battery module; the battery back is provided with a plurality of vent holes having different aperture areas which are distributed over at least one of inlet and outlet sides of the battery pack such that a cooling medium having a substantially uniform flow rate flows around each cell and/or each battery module.

3 Claims, 3 Drawing Sheets

BATTERY POWER SUPPLY DEVICE

BACKGROUND OF THE INVENTION

1. Field of the Invention

The present invention relates to a battery power supply device preferably used for an electric vehicle, such as a HEV (Hybrid Electric Vehicle), PEV (Pure Electric Vehicle) or FCEV (Fuel Cell Electric Vehicle), which uses an electric motor as at least a part of a power source.

2. Description of the Related Art

The electric vehicle, such as a HEV, PEV or FCEV, includes a high voltage battery power supply device for driving an electric motor of the electric vehicle. FIG. 3 illustrates a schematic structure of a conventional battery power supply device.

The conventional battery power supply device shown in FIG. 3 includes a battery pack 2 housed in a case 1. The battery pack 2 includes a plurality of battery modules 3 each provided in the form of a rod and a holder 4 in which the plurality of battery modules 3 are three-dimensionally disposed so as to be parallel to one another. Each battery module 3 includes a plurality of cells 5, which are serially connected together both electrically and mechanically, and is held by end plates 4a provided at both ends of the holder 4 with respect to the parallel battery modules 3. In the battery pack 2, the plurality of battery modules 3 are serially or parallelly connected together electrically. This allows a number of cells 5 to be serially connected together electrically so as to produce a prescribed high voltage.

In this conventional battery power supply device, in order to maintain the performance of the plurality of battery modules 3 parallelly arranged in the holder 4, an increase in temperature of each battery module 3 is required to be suppressed. Therefore, the battery pack 2 is structured such that the air flowing into the holder 4 as a cooling medium flows around each battery module 3 from one end to the other end of each battery module 3. Further, the battery pack 2 includes an inlet duct 6 and an outlet duct 7 respectively provided at both ends of the battery pack 2. A cooling fan 8 is provided in the inlet duct 6. The inlet and outlet ducts 6 and 7 project from the case 1.

Once the cooling fan 8 provided in the inlet duct 6 is activated, the air outside the case 1 is supplied to the battery pack 2 in the case 1 via the inlet duct 6 so as to flow around each battery module 3 in the battery pack 2 from one end to the other end of each battery module 3, thereby cooling each battery module 3. After cooling each battery module 3, the (heated) air is exhausted from the case 1 via the outlet duct 7.

In this conventional battery power supply device, each end plate 4a of the holder 4 included in the battery pack 2 is provided with a plurality of vent holes 4b so as to allow the flow of the air through the battery pack 2. The plurality of vent holes 4b provided in each end plate 4a have the same size and shape and are uniformly distributed over the end plate 4a. A cross-sectional area of the inlet duct 6 is sequentially increased along a direction from an upstream to a downstream direction of the air flow (hereinafter referred to as the "air flow direction"). On the other hand, a cross-sectional area of the outlet duct 7 is sequentially decreased along the air flow direction. The flow velocity of the air is reduced in the vicinity of a wall surface of the inlet and outlet ducts 6 and 7 due to the viscosity of the air.

Therefore, the air flowing into the inlet duct 6 is not distributed over the end plate 4a at a uniform flow velocity, and therefore the air flowing into the holder 4 via the vent holes 4b having the same size and shape is not distributed through the holder 4 at uniform flow velocity. As a result, flow velocity distribution of the air is not uniform in the holder 4, thereby causing the flow rate of the air to be nonuniform.

Specifically, at the center of the cross section of the holder 4 perpendicular to the air flow direction, flow velocity of the air is at its maximum and is sequentially decreased along directions from the center to the right, left, top and bottom. Accordingly, the flow rate of the air for cooling is sequentially decreased along a direction from the center of the cross section, which is perpendicular to the air flow direction, to the periphery, so that battery modules 3 disposed at the periphery sides are less efficiently cooled, whereby the battery modules 3 in the holder 4 are not uniformly cooled.

Further, layouts of the inlet and outlet ducts 6 and 7 are designed such that considerable pressure loss of the air is caused, and therefore the battery modules 3 in the holder 4 are not efficiently and uniformly cooled.

Furthermore, since the cooling fan 8 is provided inside the inlet duct 6, heat is generated by activating the cooling fan 8 with motor M, so that the air flowing into the holder 4 can be heated. As a result, the battery modules 3 in the holder 4 are not efficiently cooled.

Further still, the case 1 includes the battery pack 2 together with various electronic elements (not shown) provided so as to control the battery pack 2. When dew is formed through condensation due to temperature fluctuations and the presence of moisture in the case 1, these electronic elements can be easily rusted, short-circuited or deteriorated.

Any of these problems causes reduction in the performance of the conventional battery pack 2.

SUMMARY OF THE INVENTION

According to one aspect of the present invention, there is provided a battery power supply device including a battery pack in which a plurality of battery modules each includes a plurality of cells which are serially connected together both electrically and mechanically, the plurality of battery modules housed in a holder, and the battery power supply device is structured so that a cooling medium flows around each cell and/or each battery module, in which the battery back is provided with a plurality of vent holes having different aperture areas which are distributed over at least one of inlet and outlet sides of the battery pack such that a cooling medium having a substantially uniform flow rate flows around each cell and/or each battery module.

In one embodiment of this invention, the plurality of vent holes are provided in an end plate or a plurality of end plates of the holder.

In the above-described battery power supply device according to the present invention, the flow rate distribution of the cooling medium flowing around each cell and/or each battery module in the holder is uniform, thereby uniformly cooling each cell and/or each battery module.

According to another aspect of the present invention, there is provided a battery power supply device including: a battery pack in which a plurality of battery modules each includes a plurality of cells which are serially connected together electrically and mechanically, the plurality of battery modules housed in a holder, and the battery power supply device is structured so that a cooling medium flows around each cell and/or each battery module; and a case for housing the battery pack such that a space is provided around the battery pack, in which the cooling medium flows into the battery pack from the outside of the case via a duct, and then flows from the battery pack to the space in the case so as to be exhausted from an outlet provided in the case to the outside of the case.

In one embodiment of this invention, an electronic element for controlling the battery pack is provided in the space of the case.

In one embodiment of this invention, a cooling fan is disposed downstream in a direction along which the cooling medium flows through the battery pack.

In the above-described battery power supply device according to the present invention, the space in the case can be fully used as an exhaust path and the electronic element provided in the space of the case can be prevented from being deteriorated, etc., by dew condensation.

According to still another aspect of the present invention, there is provided a battery power supply device including: a battery pack in which a plurality of battery modules each includes a plurality of cells which are serially connected together both electrically and mechanically, the plurality of battery modules housed in a holder, and the battery power source is structured so that a cooling medium flows around each cell and/or each battery module; a case for housing the battery pack such that a space is provided around the battery pack; and a cooling means for forcing the cooling medium to flow into the battery pack, in which the battery back is provided with a plurality of vent holes provided in end plates of the holder, the cooling medium flows into and out of the battery pack via the plurality of vent holes so as to flow around each cell and/or each battery module, the plurality of vent holes have different aperture areas and are distributed over at least one of inlet and outlet sides of the battery pack such that a cooling medium having a substantially uniform flow rate flows around each cell and/or each battery module, and the cooling means includes a cooling fan disposed downstream in a direction along, and then flows from the battery pack to the battery pack such that the cooling medium flows into the battery pack from the outside of the case via a duct while the cooling medium in the battery pack flows through the space in the case so as to be exhausted from an outlet provided in the case into the outside of the case.

Thus, the invention described herein makes possible the advantages of providing: (1) a battery power supply device which can efficiently and uniformly cool battery modules by improving the cooling ability which prevents nonuniform cooling of the battery modules; (2) a battery power supply device which can prevent electronic elements in a battery pack from being deteriorated by dew condensation.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention are described with reference to the drawings.

Figure 1:
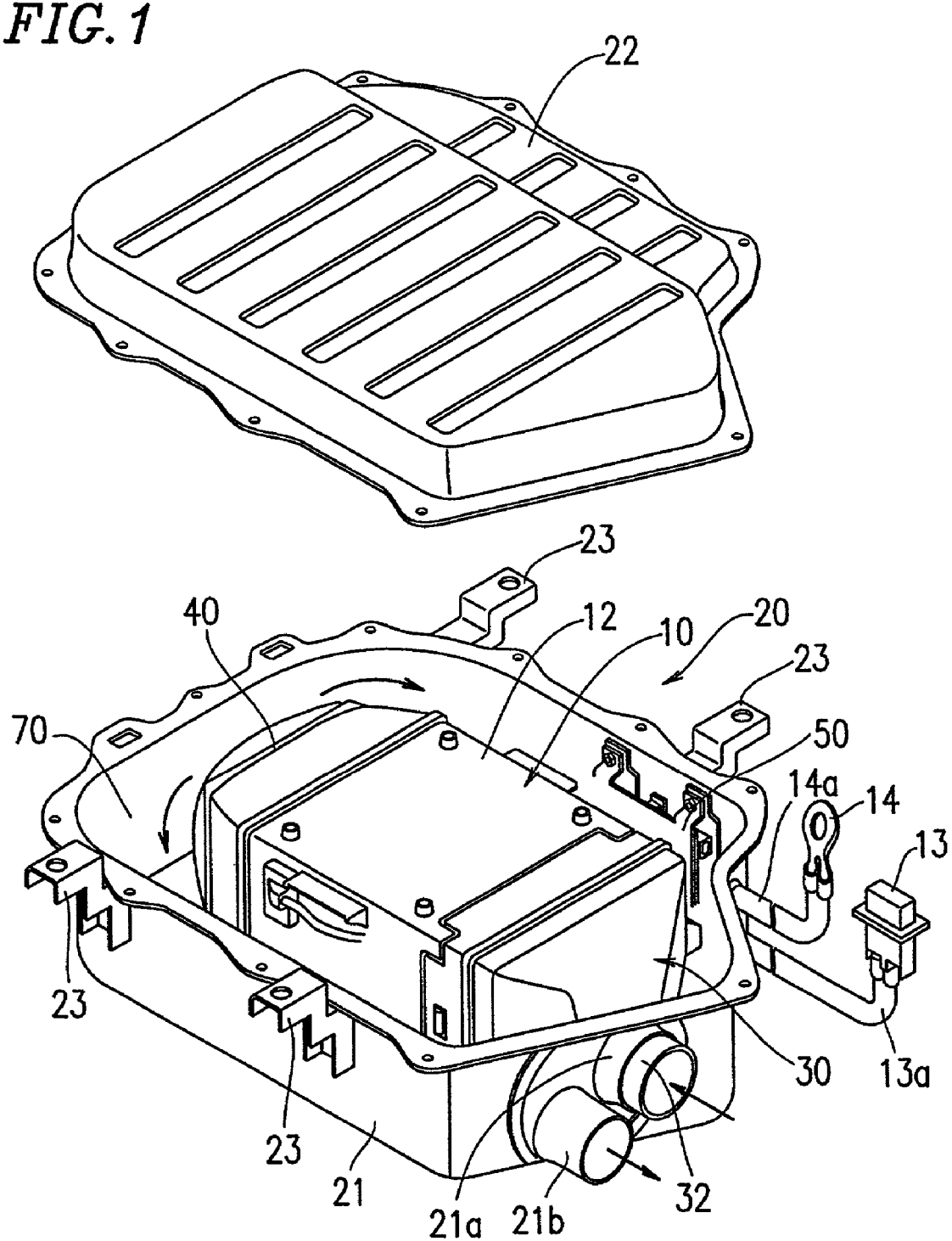
FIG. 1 is an exploded perspective view showing an example of a battery power supply device of the present invention.

FIG. 1 is an exploded perspective view showing an example of a battery power supply device according to the present invention. This exemplary battery power supply device according to the present invention is mounted on, for example, a HEV and includes: a battery pack 10 as a high voltage power source; a case 20 for housing the battery pack 10; a duct 30 provided at an inlet side of the battery pack 10 (hereinafter referred to as the "inlet duct 30"); a hood 40 provided at an outlet side of the battery pack 10 (hereinafter referred to as the "outlet hood 40" or "cooling means 40"); and an electronic element 50 for a battery pack which is housed in the case 20 together with the battery pack 10.

Figure 2:
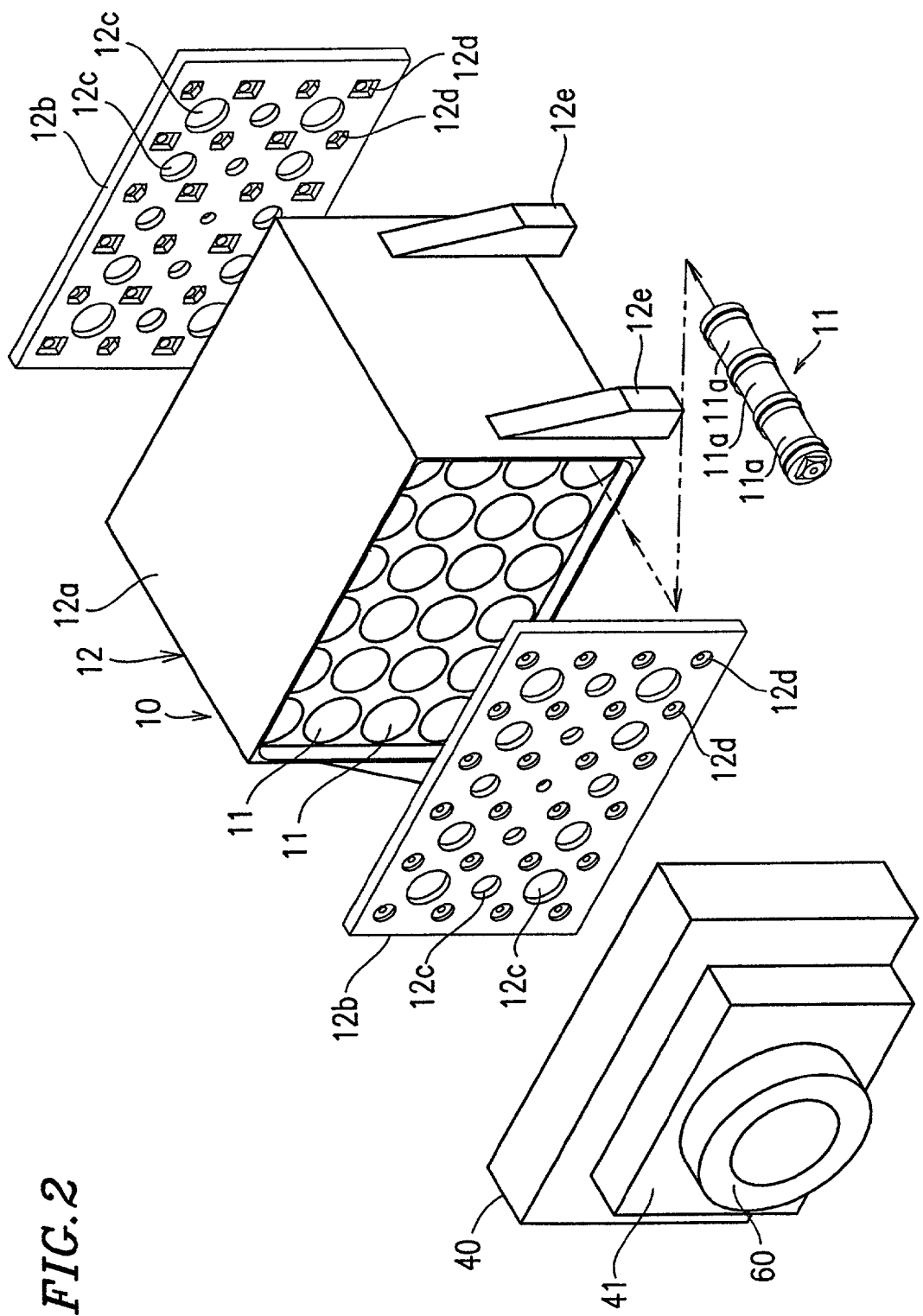
FIG. 2 is a perspective view of a battery pack used for the battery power supply device of the present invention and elements provided in the vicinity of the battery pack.
Figure 3:
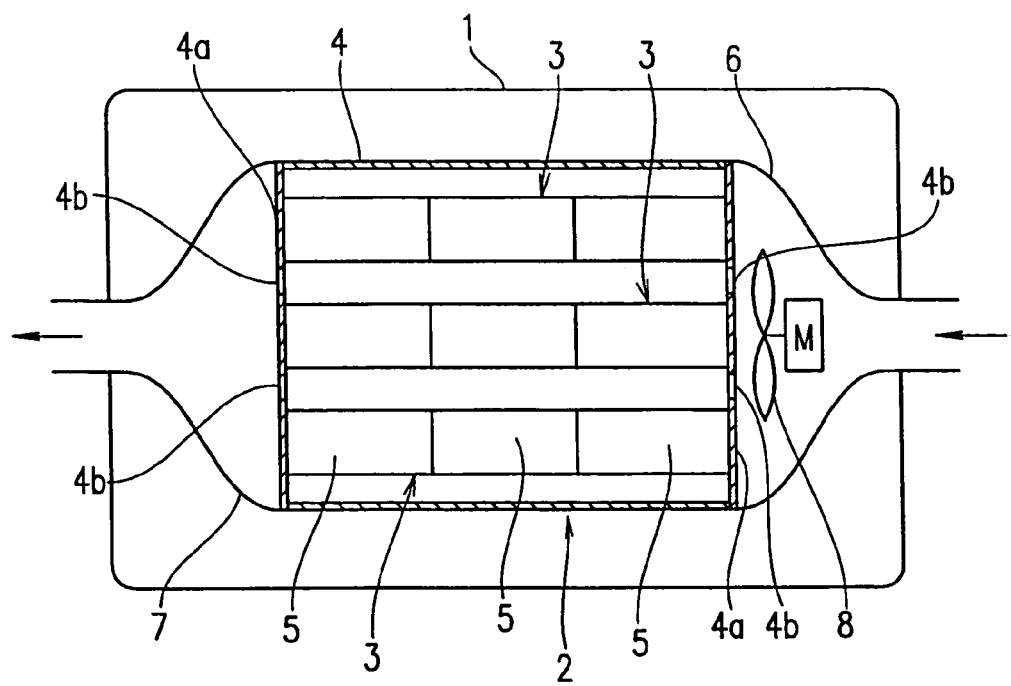
FIG. 3 illustrates a schematic structure of a conventional battery power supply device.

FIG. 2 is a perspective view of the battery pack 10 and elements provided in the vicinity of the battery pack 10, as viewed from the outlet side of the battery power supply device. As shown in FIG. 2, the battery pack 10 includes a prescribed number of battery modules 11 each provided in the form of a rod, and a resinous holder 12 for holding the battery modules 11 in a three-dimensional manner such that the battery modules 11 are parallel to one another. Each battery module 11 includes a prescribed number of cells 11a serially connected together both electrically and mechanically.

The resinous holder 12 includes a holder body 12a having a square tube-like shape and a pair of end plates 12b respectively fit into openings at both ends of the holder body 12a. Each end plate 12b serves as a plate for adjusting the flow rate of cooling air supplied as a cooling medium into the holder 12 and is integrally connected to the holder body 12a. The battery modules 11 are disposed in a state where adjacent battery modules 11 face opposite directions such that adjacent ends of the battery modules 11 have different polarities to each another. In the holder body 12a, the end plates 12b support the ends of the battery modules 11 spaced at suitable intervals from and arranged parallel to one another.

Each end plate 12b is provided with apertures 12d which receive terminals provided at the ends of the battery modules 11. Further, each end plate 12b is provided with bus bars by molding so as to be embedded in the end plate 12b. Each bus bar connects terminals of a pair of adjacent battery modules 11 to each other. Both ends of each bus bar project into the apertures 12d which receive the terminals of the pair of adjacent battery modules 11. Each terminal of the battery modules 11 has a nut structure, and therefore each bus bar is electrically and mechanically connected to a pair of terminals of the adjacent battery modules 11 by screwing a bolt into the respective terminals thereof.

Since each bus bar is electrically connected to a pair of adjacent battery modules 11, all the battery modules 11 in the holder 12 are serially connected together. Since each bus bar is also mechanically connected to the pair of adjacent battery modules 11, each terminal provided at the ends of the battery modules 11 is fixed to the corresponding end plate 12b.

Each end plate 12b is provided with a plurality of vent holes 12c which allow the flow of the air as a cooling medium through the holder 12 from the inlet side to the outlet side. The plurality of vent holes 12c are arranged such that each vent hole 12c is slightly deviated from the apertures 12d adjacent thereto, which receive the terminals of the battery modules 11, to the upward, downward, right and left directions thereof.

The vent holes 12c are arranged such that aperture areas thereof are sequentially increased along directions from the center of each end plate 12b to the right, left, top, and bottom.

The battery pack 10 is fixed in the case 20, as in a manner shown in FIG. 1, by two pairs of legs 12e (FIG. 2) each pair provided on a side surface of the holder body 12a of the holder 12. In FIG. 1, terminals 13 and 14 of the battery pack 10 are respectively connected to conductive cables 13a and 14a externally extending from the case 20.

The case 20 includes a case body 21 having an opening across the top and a lid 22 attached to the case body 21 so as to close the opening of the case body 21. The case body 21 includes on each side surface a pair of attachment members 23 used for attachment to a vehicle (i.e., a HEV). The battery pack 10 is fixed in the case 20 such that a sufficiently large space 70 is provided around the battery pack 10. One end surface of the case body 21 is provided with an inlet 21a and an outlet 21b which are adjacent to each other. The inlet 21a faces an inlet end surface of the battery pack 10 housed in the case body 21.

The inlet duct 30 provided at the inlet side of the battery pack 10 has one end connected to the inlet end surface of the battery pack 10 and has a funnel-like shape such that a cross-sectional area of the inlet duct 30 is sequentially decreased along a direction away from the battery pack 10. The inlet duct 30 includes at the center thereof a connection tube 32 projected from the inlet duct 30 so as to be inserted into the inlet 21a provided in the case body 21 of the case 20. The connection tube 32 projects through the inlet 21a to the outside of the case body 21.

Referring again to FIG. 2, a cross-sectional area of the outlet hood 40 provided at the outlet side of the battery pack 10 is sequentially decreased along a direction away from the battery pack 10. The outlet hood 40 includes at the center thereof an opening 41 in which a cooling fan 60 is provided.

The cooling fan 60 provided in the opening 41 of the outlet hood 40 draws the air out from the battery pack 10 so as to introduce the air into the battery pack 10 from the outside of the case 20 via the inlet duct 30. Referring again to FIG. 1, after the air flows through the battery pack 10 from the inlet duct 30 to the outlet hood 40, the air is exhausted directly into the case 20. The air exhausted into the case 20 flows through the space 70 provided around the battery pack 10 to the end surface of the case body 21 in which the inlet 21a and outlet 21b are provided, so that the air is exhausted from the outlet 21b to the outside of the case 20.

In the case 20, the electronic element 50 for controlling the battery pack 10 is provided on an inner surface of the case body 21 so as to be in contact with the air flowing through the case 20.

In this battery power supply device according to the present invention, by activating the cooling fan 60 provided in the outlet hood 40 of the battery pack 10 disposed in the case 20, the air in the holder 12 of the battery pack 10 is drawn so as to be exhausted from the holder 12 into the outside of the holder 12. Along with this, the air is drawn from the outside of the case 20 to the inlet duct 30.

Referring again to FIG. 2, the air drawn into the inlet duct 30 is introduced into the holder 12 via the plurality of vent holes 12c provided in the end plate 12b at the inlet side of the holder 12. The vent hole 12c provided at the center of the end plate 12b has the smallest aperture area among the plurality of the vent holes 12c provided in the end plate 12b and the vent holes 12c sequentially become larger along the directions from the smallest vent hole 12c to the right, left, top, and bottom. Therefore, in the inlet duct 30 where a cross-sectional area thereof is sequentially increased along the air flow direction, the air flows into the holder 12 such that the flow rate of the air in a single battery module 11 is substantially uniform.

The air flowing into the holder 12 flows around each battery module 11 along the length thereof so as to be exhausted from the vent holes 12c provided in the other end plate 12b into the outlet hood 40.

The vent hole 12c provided at the center of this end plate 12b also has the smallest aperture area among the plurality of the vent holes 12c provided in the end plate 12b and the vent holes 12c sequentially become larger along the directions from the smallest vent hole 12c to the right, left, top, and bottom. Therefore, in the outlet hood 40 where a cross-sectional area thereof is sequentially decreased along the air flow direction, the flow rate of the air in a single battery module 11 can be maintained so as to be substantially uniform, so that the flow rate of the air in the holder 12 is also substantially uniform.

Each battery module 11 is cooled by the air having a substantially uniform flow rate in the holder 12. Therefore, each battery module 11 in the holder 12 is efficiently cooled across the entire battery module 11.

The air is exhausted by the cooling fan 60 from the outlet hood 40 into the case 20 and flows through the space 70 provided around the battery pack 10 in the case 20 to the end surface in which the outlet 21b is provided, so that the air is exhausted from the outlet 21b to the outside of the case 20.

Since the air exhausted from the holder 12 into the outlet hood 40 is exhausted from the opening 41 of the outlet hood 40 directly into the case 20 so as to flow around the battery pack 10 through the case 20, pressure loss of the air is prevented from being considerable. As a result, there is no possibility that the flow rate of the air in the holder 12 is reduced, and therefore each battery module 11 is efficiently cooled.

Further, the air exhausted from the battery pack 10 cools each battery module 11 so that the air has an increased absolute temperature and reduced relative humidity, and therefore the electronic element 50 for controlling the battery pack 10 disposed in the case 20 is in contact with the air having reduced relative humidity, thereby preventing dew from being formed on the electronic element 50. As a result, the electronic element 50 is prevented from being rusted, deteriorated, short-circuited, etc., by dew condensation.

Furthermore, although the cooling fan 60 generates heat when being activated, since the cooling fan 60 is disposed at the outlet side of the battery pack 10, there is substantially no possibility that the air drawn into the battery pack 10 is heated, and therefore each battery module 11 in the battery pack 10 is efficiently cooled by the air which is not heated.

As described above, the battery power supply device of the present invention provides efficient cooling of each battery module 11, thereby effectively suppressing a drop in the battery performance.

In this embodiment, although the vent holes 12c in each end plate 12b provided at both ends of the holder 12 have different aperture areas, the vent holes 12c having different aperture areas can be provided in only one of the end plates 12b. Alternatively, instead of providing the vent holes 12c having different aperture areas, the vent holes 12c having the same aperture areas can be distributed over each end plate 12b such that the number of the vent holes 12c provided at the center of the end plate 12b is reduced and the number of the vent holes 12c provided at the periphery sides is increased, or a combination of the vent holes 12c having different aperture areas and the vent holes 12c having the same aperture areas can be used.

Further, the shape of the vent holes 12c is not limited to being round and can be triangular, rectangular, slit-shaped or the like.

Furthermore, instead of providing the vent holes 12c in the end plates 12b, the holder 12 can be provided with plates only including the vent holes 12c.

Further still, in the battery power supply device of the present invention, although each battery module 11 of the battery pack 10 is provided in the form of a rod, the battery module 11 is not limited to being rod-shaped and can be formed by square cells, for example. In this case, a flow path of the air is also secured around the battery module 11. In addition, the battery module 11 can be formed by internally connecting the square cells.

As described above, the present invention provides a battery power supply device in which a plurality of vent holes having different aperture areas are distributed over at least one end of a battery pack such that a cooling medium having a substantially uniform flow rate flows around each of a plurality of battery modules disposed in the battery pack, thereby uniformly and efficiently cooling the battery modules.

Further, the battery power supply device of the present invention is structured such that the battery pack is housed in a case so as to provide a space around the battery pack, the air is drawn from the outside of the case into the case via a duct, and the cooling medium is exhausted from the battery pack directly into the case in the space around the battery pack so as to be exhausted from an outlet provided in the case, whereby it is possible to suppress a drop in ability to cool the battery modules.

Furthermore, by providing an electronic element for controlling the battery pack in the case so as to be in contact with the cooling medium exhausted from the battery pack, it is possible to prevent dew from being formed on the electronic element.

Further still, a cooling fan is disposed at an outlet side of the battery pack so as to prevent the air used for cooling the battery modules from being heated due to heat generation of the cooling fan, and therefore it is possible to further suppress a drop in the ability to cool the battery modules.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A battery power supply device comprising:
   a case;
   a battery pack including an outlet hood, the battery pack fixed in the case;
   a holder in the battery pack;
   a plurality of battery modules housed in the holder;
   a plurality of cells within each battery module;
   each cell in the plurality of cells within a respective battery module are serially connected together both electrically and mechanically;
   wherein the plurality of battery modules are disposed within the holder at suitable intervals from and arranged parallel to one another, so that a cooling medium flows uniformly along each entire longitudinal surface of each battery module; and
   wherein the battery pack is provided with a plurality of vent holes having different aperture areas which are distributed over at least one of inlet and outlet sides of the battery pack, wherein a vent hole at the center of the inlet or the outlet side of the battery pack has the smallest aperture area, such that the cooling medium, having a substantially uniform flow rate, flows uniformly along each entire longitudinal surface of each battery module; and
   wherein the cooling medium is exhausted from the outlet hood into the case and flows through a space provided between the battery pack in the case to an outlet provided in the case so that the cooling medium is exhausted to the outside of the case.

2. A battery power supply device according to claim 1, wherein the plurality of vent holes are provided in an end plate or a plurality of end plates of the holder.

3. A battery power supply device according to claim 1, wherein the plurality of battery modules are disposed within the holder in a three-dimensional manner.

* * * * *